(12) United States Patent
Fujino

(10) Patent No.: US 8,120,201 B2
(45) Date of Patent: Feb. 21, 2012

(54) LED VEHICLE LIGHTING APPARATUS

(75) Inventor: Takashi Fujino, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 286 days.

(21) Appl. No.: 12/613,257

(22) Filed: Nov. 5, 2009

(65) Prior Publication Data

US 2010/0117538 A1 May 13, 2010

(30) Foreign Application Priority Data

Nov. 11, 2008 (JP) ................................ 2008-289007

(51) Int. Cl.
*B60L 1/14* (2006.01)
(52) U.S. Cl. ......... 307/10.8; 315/82; 315/224; 315/246; 315/308
(58) Field of Classification Search .................. 307/10.8; 315/82, 185 R, 186, 209 R, 210, 224, 246, 315/247, 276, 291, 307, 308
See application file for complete search history.

(56) References Cited

U.S. PATENT DOCUMENTS

| | | | |
|---|---|---|---|
| 7,741,788 B2 * | 6/2010 | Ito et al. | 315/247 |
| 7,906,917 B2 * | 3/2011 | Tripathi et al. | 315/291 |
| 7,999,478 B2 * | 8/2011 | Noyori et al. | 315/77 |
| 8,008,864 B2 * | 8/2011 | Nguyen et al. | 315/122 |
| 2005/0093792 A1 | 5/2005 | Yamamoto et al. | |
| 2007/0267984 A1 | 11/2007 | Peng | |
| 2007/0273306 A1 | 11/2007 | Fujino et al. | |

FOREIGN PATENT DOCUMENTS

| | | |
|---|---|---|
| JP | 2005-136157 A | 5/2005 |
| JP | 2006-103404 A | 4/2006 |

* cited by examiner

*Primary Examiner* — Thuy Vinh Tran

(74) *Attorney, Agent, or Firm* — Kenealy Vaidya LLP

(57) ABSTRACT

An LED vehicle lighting apparatus including a fail-safe function can supply a plurality of LEDs connected in series with a requisite voltage that is larger than a supply voltage of a battery. The vehicle lighting apparatus can include a DC-DC convertor and a subsidiary feed circuit. The DC-DC convertor can be configured to supply the LEDs with a substantially constant current by a controller. At least one output of the subsidiary feed circuit is connected to an LED in the LEDs, and a switching element can also be connected between the LED and ground. When the controller has a breakdown or trouble, LEDs between the LED and ground can be directly lighted by the battery in accordance with a signal provided by the controller. Thus, the disclosed subject matter can provide various LED lighting apparatuses including a user friendly fail-safe function.

20 Claims, 5 Drawing Sheets

LED VEHICLE LIGHTING APPARATUS

This application claims the priority benefit under 35 U.S.C. §119 of Japanese Patent Application No. 2008-289007 filed on Nov. 11, 2008, which is hereby incorporated in its entirety by reference.

BACKGROUND

1. Field

The presently disclosed subject matter relates to an LED lighting apparatus for a vehicle lamp, and more particular to an LED vehicle lighting apparatus including a user friendly fail safe circuit in which an amount of forward voltage for LEDs connected in series is larger than a supply voltage of a battery.

2. Description of the Related Art

Various LEDs have been used as a light source for vehicle lamps (e.g., headlights, tail-lights, stop lights, signal lights, etc.) such as in autos, trucks, buses and so on. One reason is that LEDs can emit variously-colored lights so as to match those typically used in vehicle lamps while the structure therefore can be thin and small in size. In addition, LEDs may be great for ecology due to a long life, etc.

When LEDs are used as a light source for the vehicle lamps, a plurality of LEDs may be connected in series in order to conform to a light distribution standard for a vehicle lamp. For example, a lighting circuit for a vehicle lamp including a plurality of LEDs is disclosed in Patent Document No. 1 (Japanese Patent Application Laid Open JP2006-103404). FIG. 5 is a circuit diagram showing the conventional lighting circuit for a vehicle lamp that is disclosed in Patent Document No. 1.

The lighting circuit can control the plurality of LEDs LB to create a low beam for a headlight, and can control the plurality of LEDs HB to create a high beam for a headlight. In these LEDs LB and HB, around 10 pieces of LEDs to 20 pieces of LEDs can be operated to emit light with a brightness suitable for a vehicle headlight. When these LEDs are connected in parallel, the interconnection may be subject to certain complications, and therefore these LEDs are usually connected in series. Thus, the amount of forward voltage for the LEDs may become approximately 35 volts to 70 volts when the LEDs are composed of white LEDs based upon a blue LED and a yellow phosphor.

However, although a supply voltage of a vehicular battery may change from about 10 volts to 16 volts according to a discharge/charge status of a vehicular battery, these LED cannot typically be driven directly by the vehicular battery because of the low voltage. Therefore, the conventional lighting circuit provides these LEDs LB and HB with a boosted voltage by providing a DC-DC converter between the vehicular battery and these LEDs LB and HB.

The lighting circuit includes: a transformer $2a$ having a primary coil and a secondary coil, and one terminal of the primary coil connected to a battery 1 via a switch SW; a switching element Qp having a drain that is connected to the other terminal of the primary coil of the transformer $2a$; a diode $2c$ having an anode that is connected to one terminal of the secondary coil of the transformer $2a$; a capacitor $2d$ connected between a cathode of the diode $2c$ and the other terminal of the secondary coil of the transformer $2a$; a resistor Rs located between a cathode of a last LED of the LEDs HB and the other terminal of the secondary coil of the transformer $2a$ that is connected to ground; and a controller $2b$ having a feedback terminal and an output that is connected to a gate of the switching element Qp.

The switching element Qp is alternated on and off in accordance with a pulse width modulation (PWM) signal output from the controller $2b$, which is configured to control the on and off time of the switching element Qp under a feed back control so that a current If flowing in the resistor Rs for detecting the current of the LEDs can be constant, if a voltage of the battery 1 and a load of these LEDs LB and HB change.

The switching element Qp can be alternately turned on and off at a frequency ranging between ten thousand Hertz to several hundred thousand Hertz, and therefore a DC voltage of the battery 1 can be converted into an AC voltage. The AC voltage may be changed to a smooth DC voltage with the diode $2c$ and the capacitor $2d$, and the LEDs LB and HB can emit light by providing them with this boosted DC voltage.

In the above-described lighting circuit, when a driver turns on a high beam for a headlight, these LEDs LB and HB can emit light in high beam mode by turning on the switch SW. When the driver turns on a low beam for the headlight, a voltage between the LEDs HB becomes a low voltage that is close to zero voltage by turning on a switching element Qs with a signal S, the LEDs LB can emit light as the low beam while the LEDs HB for the high beam turn off.

According to the conventional lighting circuit described above, when a disconnection is caused in a circuit between the LEDs HB at the high beam, the lighting circuit includes a characteristic or problem in that both the LEDs LB and HB cannot work simultaneously. Therefore, when detecting a disconnection between the LEDs HB, the LEDs LB can light as a fail-safe function for the high beam of the headlight by turning on the switching element Qs.

An LED lighting apparatus including a number of LEDs is disclosed in Patent Document No. 2 (U.S. Patent Application Publication No. 2007/0273306). The conventional LED lighting apparatus can drive the many LEDs connected in series using a boosting circuit and an inverted boosting circuit based on a controller. The LED lighting apparatus includes a shutdown circuit to stop supply from a power supply when a load that includes the LEDs is in a circuit that is either opened or shorted as a fail-safe function.

The above-referenced Patent Documents are listed below and are hereby incorporated with any related English abstracts in their entireties.
1. Patent Document No. 1: Japanese Patent Application Laid Open JP2006-103404
2. Patent Document No. 2: U.S. Patent Application Publication No. 2007/0273306 to Fujino et al. published on Nov. 29, 2007

In the conventional lighting circuit shown in FIG. 5, because the controller $2b$ may be generally composed of an expensive and specific IC and peripheral parts, the LEDs LB and HB may be controlled by the one controller $2b$. Therefore, when the controller $2b$ has a breakdown due to a various causes, such as a surge and the like, the conventional light unit including both LEDs LB and HB may not light.

According to the conventional lighting apparatus that is disclosed in Patent Document No. 2, the controller may not breakdown because of the shutdown circuit even if an over current flows in the circuit or in the LEDs occurs in the circuit. However, the LEDs may not light, and may need to be replaced with new LEDs before operation can begin again. Therefore, the fail safe function may not be sufficient when the lighting apparatus is used for a vehicle lamp.

The disclosed subject matter has been devised to consider the above and other problems and characteristics. Thus, an embodiment of the disclosed subject matter can include an LED vehicle lighting apparatus having a user friendly fail safe function for supplying LEDs connected in series with a requisite voltage and power even if the amount of forward voltage of LEDs connected in series is larger than a supply voltage of a battery. The various characteristics, features, and problems described above are thus addressed and possibly reduced or changed while also addressing and possibly reducing other associated problems regardless of the above-described combined headlight.

SUMMARY

The presently disclosed subject matter has been devised in view of the above described characteristics and problems, etc. An aspect of the disclosed subject matter includes an LED vehicle lighting apparatus that has a user friendly fail safe function even when a disconnection occurs in a load including the plurality of LEDs.

According to another aspect of the disclosed subject matter, an LED vehicle lighting apparatus can include: a plurality of LEDs connected in series including a first LED and a last LED; a DC-DC convertor including an input, an output, a switching element, a resistor and a controller, the output configured to supply electricity between the first LED and the last LED, the input thereof connected to a power supply and the switching element, the resistor configured to detect an LED current at the plurality of LEDs connected in series, the controller having an output that is connected to the switching element, and the controller configured to control the DC-DC converter so as to provide a lager voltage than a voltage of the power supply from the output of the DC-DC converter in accordance with the LED current detected by the resistor; a signal detector including an input and an output, and the input thereof configured to detect a breakdown of the controller; and a feed controller including an input and an output, the input thereof connected to the output of the signal detector, and the output connected between the plurality of LEDs, wherein at least one LED connected in series between an LED connected to the output of the feed controller and the last LED can be lighted by the voltage of the power supply in accordance with the input of the signal detector.

In the exemplary LED vehicle lighting apparatus, the controller can be configured with a PWM control IC having a reference voltage so that the reference voltage can output a signal in case the PWM control IC has trouble. The input of the signal detector can be connected to the output of the PWM control IC or the reference voltage of the PWM control IC. Thus, when the controller including the PWM control IC has a breakdown, because the LEDs between an LED connected to the output of the feed controller and the last LED can be lighted, the operation of the lighting apparatus can continue.

According to another aspect of the disclosed subject matter, an LED vehicle lighting apparatus can include: a plurality of LEDs connected in series including a plurality of first LEDs and a plurality of second LEDs; a first switching element including a gate, and configured to short between a first LED of the plurality of second LEDs and a last LED of the plurality of second LEDs by the gate; the same controller and signal detector as those in the above-described aspect; a feed controller including an input, a first output, and a second output, the input thereof connected to the output of the signal detector, and the first output connected between the plurality of first LEDs, wherein at least one LED connected in series between an LED connected to the first output and the last LED of the plurality of first LEDs can be lighted by the voltage of the power supply in accordance with the input of the signal detector and the gate of the first switching element.

In the immediately above-described exemplary embodiment, the first output of the feed controller can be connected to the gate of the first switching element via a resistor. The LED vehicle lighting apparatus can also include a second switching element including a gate, and can be configured to short between an LED of the plurality of second LEDs and the cathode of the last LED of the plurality of second LEDs by the gate, and the LED of the plurality of second LEDs can be connected to the second output of the feed controller, wherein at least one LED connected in series between the LED and the last LED of the plurality of second LEDs can be lighted in accordance with the input of the signal detector and the gate of the second switching element. In addition, the controller can be configured with a PWM control IC having a reference voltage so that the reference voltage can output a signal in case the PWM control IC has trouble, and the input of the signal detector can be connected to the output of the PWM control IC or the reference voltage of the PWM control IC.

According to the above-described exemplary embodiment, when the apparatus is used for the combined headlight including a low beam and a high beam, even if the controller including the PWM control IC has a breakdown, the respective parts of the first LEDs and the second LEDs can be lighted by using the first and the second switching element so as to associate the low and the high beam therewith. Thus, the disclosed subject matter can provide various LED vehicle lighting apparatuses including a user friendly fail safe function.

According to another aspect of the disclosed subject matter, in the above-described exemplary embodiments, a fail-safe function for a disconnection of a load including the above-described LEDs can be included in the apparatus. The apparatus can further include: a voltage detection circuit including an output, and connected between the first LED and the last LED; and an AND circuit including an output and two inputs, and the two inputs can be connected to the output of the voltage detection circuit and the reference voltage terminal of the PWM control IC so as to connect the output of the AND circuit to the input of the signal detector.

According to another aspect of the disclosed subject matter, the LED vehicle lighting apparatus can include the fail safe function for the open circuit of the load while reducing damage thereof by a load failure that involves the LEDs, or the like. Thus, the disclosed subject matter can provide LED vehicle lighting apparatuses that can maintain constant operation ability.

BRIEF DESCRIPTION OF THE DRAWINGS

The above and other characteristics and features of the disclosed subject matter will become clear from the following description with reference to the accompanying drawings, wherein.

DETAILED DESCRIPTION OF EXEMPLARY EMBODIMENTS

Figure 1:
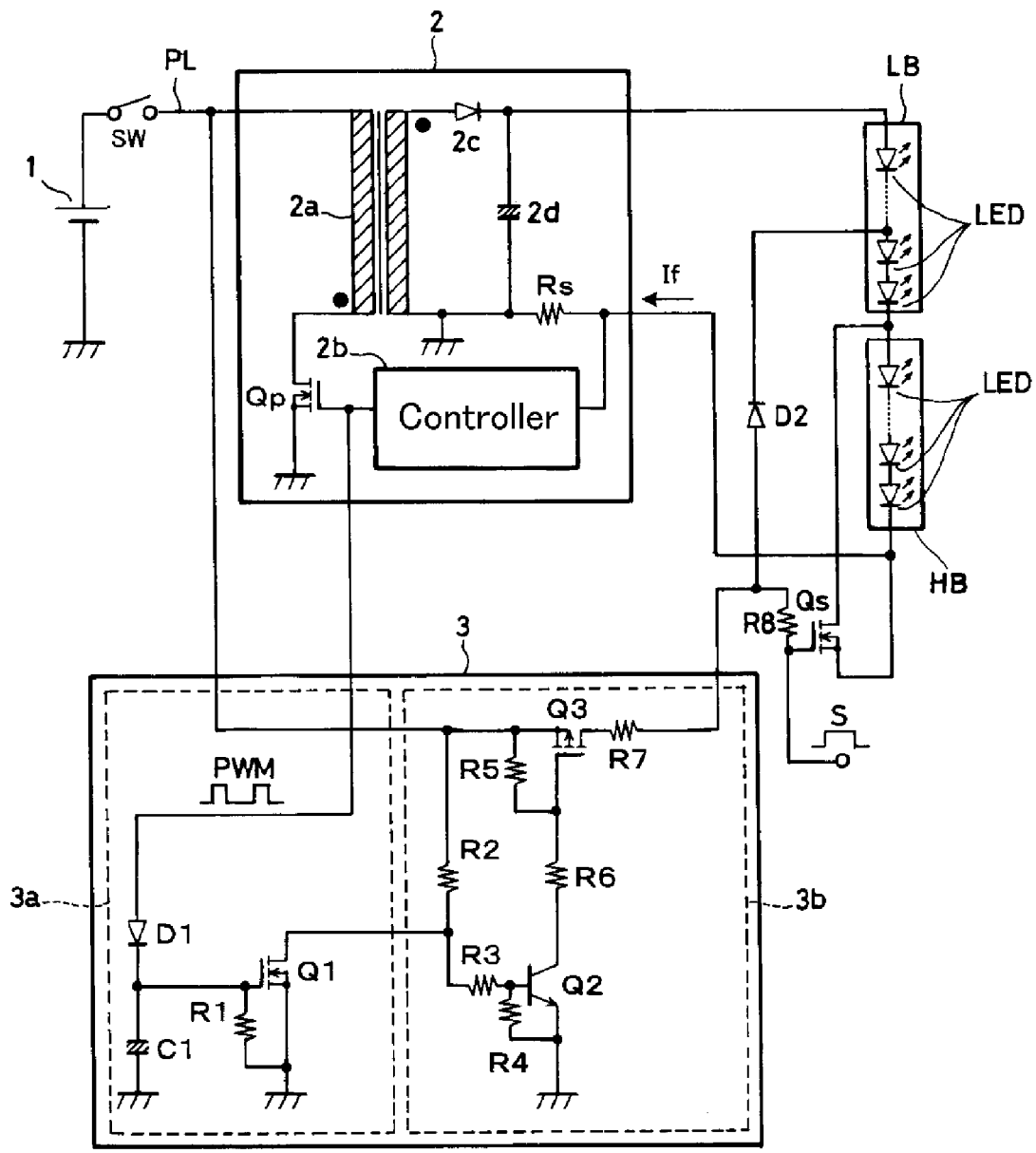
FIG. 1 is a block circuit diagram showing a first exemplary embodiment of an LED vehicle lighting apparatus made in accordance with principles of the disclosed subject matter.

Exemplary embodiments of the disclosed subject matter will now be described in detail with reference to FIGS. 1-4. FIG. 1 is a block circuit diagram showing a first exemplary embodiment of an LED vehicle lighting apparatus made in accordance with principles of the disclosed subject matter. An exemplary embodiment of an LED vehicle light apparatus can be composed by combining the lighting circuit shown in FIG. 5 with a subsidiary feed circuit 3.

In FIG. 1, the same or corresponding elements of the lighting circuit described above use the same reference marks as used in the lighting circuit described above, and therefore their description is abridged in the following description. The subsidiary feed circuit 3 can include or consist of a signal detector 3a and a feed controller 3b. The signal detector 3a can include a diode D1 of which an anode is connected to the output of the controller 2b in the DC-DC converter 2.

When the DC-DC converter 2 normally operates, a PWM signal is output from the output of the controller 2b, and the PWM signal can be input to the anode of the diode D1. The PWM signal can become a smooth DC voltage via the diode D1 and a capacitor C1, and the DC voltage can be applied to a gate of an FET Q1. Consequently, the FET Q1 can maintain an on state. A resistor R1 can discharge any parasitic capacitance between the gate and a source of the FET Q1.

The feed controller 3b can include: an FET Q3 having a source that is connected to a power supply line PL, and a gate thereof connected to the power supply line PL via a resistor R5; a transistor Q2 having a collector that is connected to the gate of the FET Q3 via a resistor R6, a base thereof connected between a resistor R3 and a resistor R4, and an emitter thereof connected to ground along with the other terminal of the resistor R4; and a resistor R2 connected to the power supply line PL along with the source of the FET Q3, and the other terminal thereof connected to the other terminal of the resistor R3 with along a drain of the FET Q1.

The feed controller 3b can also include a resistor R7 that is connected to a drain of the FET Q3, and the other terminal of the resistor R7 that is connected to a terminal in the LEDs LB via a diode D2. The diode D2 can prevent an LED current in the LEDs LB from flowing toward the FET Q3 and the FET Qs. The other terminal of the resistor R7 can also be connected to a gate of the FET Qs via a resistor R8. The FET Qs can be the switching element for switching the low beam and the high beam by the signal S from the gate thereof, which can also be controlled by a signal from the other terminal of the resistor R7 via the resistor R8. The terminal in the LEDs LB can be selected so that at least one LED between an LED connected to the terminal and a last LED of the LEDs LB can emit light within the range of the supply voltage of the vehicle battery 1.

The subsidiary feed circuit 3 in the first exemplary embodiment of the disclosed subject matter can be configured as described above. The fail safe function of the LED vehicle lighting apparatus using the subsidiary feed circuit 3 will now be described. When LEDs LB and HB normally emit light by the DC-DC converter 2 based on the controller 2b, the controller 2 can apply the PWM signal to the gate of the FET Qp and the anode of the diode D1 in the signal detector 3a.

Therefore, the FET Q1 can maintain an on state by providing the gate of the FET Q1 with the DC voltage via the diode D1 and the capacitor C1, and a current can flow between the drain of the FET Q1 and the source that is connected to ground. Consequently, the transistor Q2 can maintain an off state, and also the FET Q3 can disconnect between the source and the drain thereof. In that case, if the controller 2 stops applying the PWM signal due to some trouble, the LEDs LB and HB stop emitting light because the boosted voltage generated from the DC-DC converter 2 stops being provided to the LEDs LB and HB.

However, the FET Q1 can turn off because the current of the diode D1 stops and the gate current of the FET Q1 stops, and the transistor Q2 can turn on. Therefore, the FET Q3 can also turn on, and the power supply can be applied to the terminal in the LEDs LB via the source and drain of the FET Q3, the resistor 7 and the diode D2. In this case, the FET Qs can turn on because the gate current can flow in the FET Qs via the resistor R8, and a cathode of the last LED in the LEDs LB can achieve a connecting state to ground via the FET Qs. Thus, the LEDs between the terminal in the LEDs LB and the last LED can emit light while the LEDs HB maintain an off state.

When the gate of the FET Qs is not connected to the resistor 7 via the resistor 8 in FIG. 1, the LEDs between the terminal in the LEDs LB and the last LED of the LEDs LB can emit light in accordance with the signal S of the FET Qs for the following reason. Even when the FET Qs keeps an off state and the LEDs HB can normally emit light, LEDs between the terminal in the LEDs LB and the last LED of the LEDs HB cannot emit light by the supply voltage of the vehicle battery 1 because an amount of forward voltage in the LEDs may be larger than the supply voltage of the vehicle battery 1. Therefore, the LEDs between the terminal in the LEDs LB and the last LED of the LEDs LB cannot emit light when the FET Qs is off, but the LEDs can light when the FET Qs is on.

The above-described circuit configurations can be selected by usage of the LED vehicle lighting apparatus. For instance, when the LEDs LB and HB are used for a stop lamp, it may be favorable that the LEDs emit light in accordance with the signal S by associating a stop lamp switch with the signal S. If the LEDs LB and HB are used for a tail lamp, it may be favorable that the LEDs can emit light regardless of the signal S for the FET Qs. An exemplary controller in the DC-DC converter 2 will now be given.

A PWM control IC can be used as the controller 2b, and also a dual PWM control IC (for example, TL1451A made by Texas Instruments, Inc.) can be used as the controller 2b. When the dual PWM control IC is used as the controller 2b, the other PWM control therein can be used for driving another headlight, tail lamp, stop lamp and the like, and also can independently drive LEDs LB and HB while the fail safe function is associated with respect to each other.

The dual PWM control IC 2 can include; dual output circuits with common-emitter transistors; two control circuits for controlling the dual output circuits, respectively; two feedback inputs for receiving feedback; two error amplifiers to allow feedback thereto; a reference voltage generator therein; and two dead-time control comparators. The two dead-time control comparators can be configured to have no offset unless externally altered, and can provide 0% to 100% dead time, respectively. Thus, the dual PWM control IC 2 can stably control the dual output circuits for the PWM outputs, respectively.

In addition, the reference voltage can be configured to output a signal for stopping when the control IC experiences trouble. Therefore, the above-described fail safe function can also be operated by replacing the output signal from the controller 2b with the reference voltage Vref. In this case, when the controller 2 has a breakdown or other trouble, because the Vref signal becomes a low level, the Vref signal can result in turning off the FET Q1. Thus, the fail safe function can carry out the same operation as that in the first exemplary embodiment shown in FIG. 1.

Figure 2:
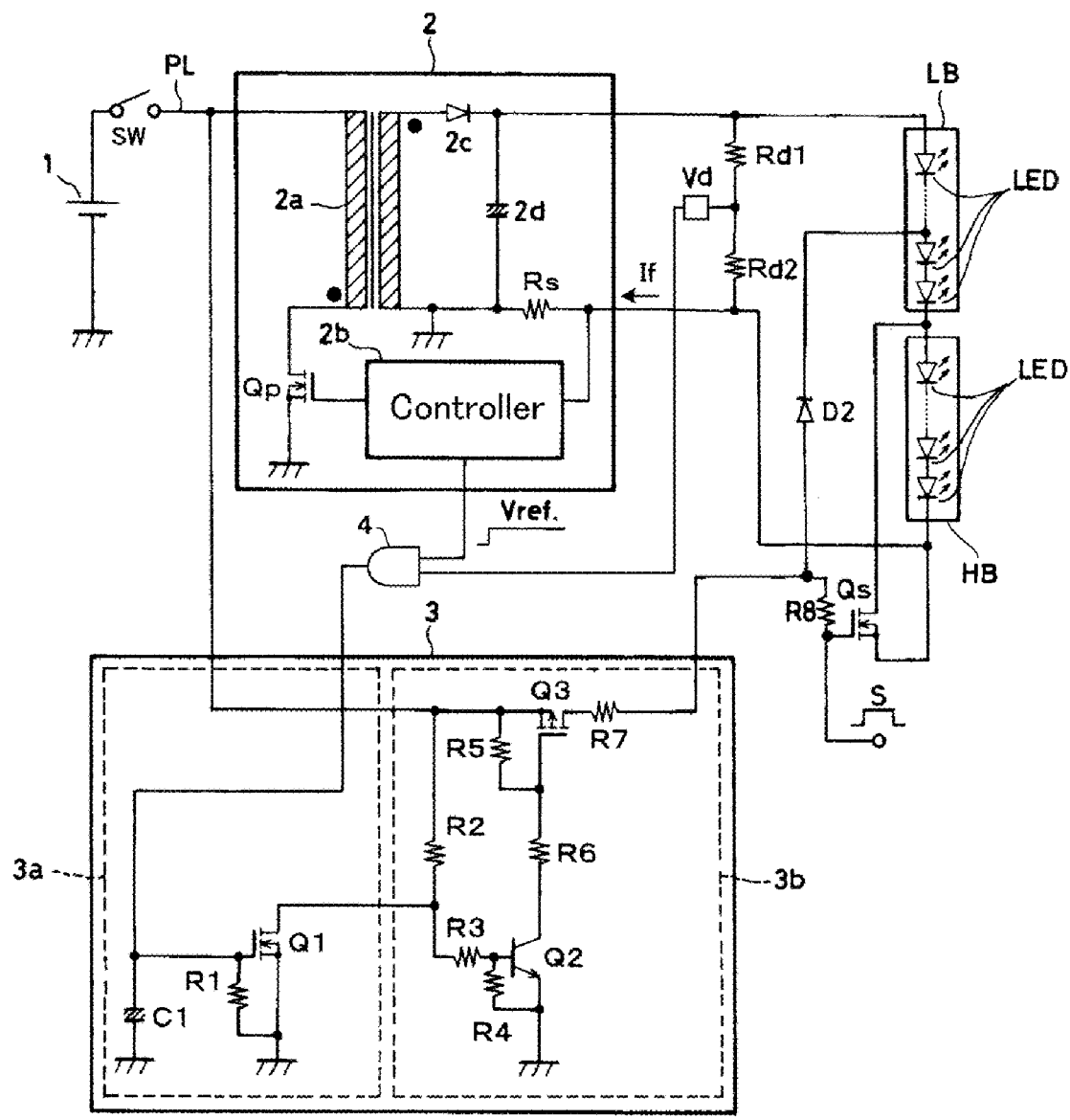
FIG. 2 is a block circuit diagram showing a second exemplary embodiment of an LED vehicle lighting apparatus made in accordance with principles of the disclosed subject matter.

FIG. 2 is a block circuit diagram showing a second exemplary embodiment of an LED vehicle lighting apparatus made in accordance with principles of the disclosed subject matter. In FIG. 2, the same or corresponding elements of the LED vehicle lighting circuit described above use the same reference marks as those used in FIG. 1, and therefore their description and operation characterization are abridged in the following description.

A difference between the operations shown in FIGS. 1 and 2 can include the ability to detect trouble such as an open circuit of a load that includes the LEDs LB and HB in the second exemplary embodiment shown in FIG. 2. The open circuit may detect a load failure by detecting the current If that is smaller than a predetermined current. However, it is difficult for the current detection to detect a very small current If such as when an open circuit of a load occurs, especially because an open circuit of a load may be suddenly generated.

In that case, the output voltage of the DC-DC converter 2 may suddenly increase in order to suddenly cause the LED current If to decrease. A voltage detection circuit Vd can easily detect the open circuit of a load by measuring a voltage between divided resistors Rd1 and Rd2. These resistors Rd1 and Rd2 can be connected between the anode of the first LED of the LEDs LB and the cathode of the last LED of the LEDs HB as shown in FIG. 2, and can also prevent an over voltage between the outputs of the DC-DC converter 2 at the open circuit. The voltage detection circuit Vd can control the subsidiary feed circuit 3 by using an output signal thereof. The output signal can be used an inverted output between these resistor Rd1 and Rd2 in order to match the Vref of the controller 2b.

More specifically, when the DC-DC converter 2 normally operates and the LEDs LB and HB normally light, because the reference voltage Vref of the PWM control IC maintains a high level and the output of the voltage detection circuit Vd also maintains a high level, an AND circuit 4 can output a high level. Therefore, the subsidiary feed circuit 3 does not operate. However, when an open circuit occurs in the circuit including the LEDs LB and HB, because the output of the voltage detection circuit Vd turns to a low level, the output of the AND circuit 4 turns to a low level, and therefore the subsidiary feed circuit 3 operates. In this case, the LEDs between the terminal in the LEDs LB and the last LED of the LEDs LB can light as described in the first exemplary embodiment.

When the controller 2b has a breakdown or experiences trouble, because the Vref of the PWM control IC turns to a low level and the output of the AND circuit 4 also turns to a low level, the subsidiary feed circuit 3 starts operating the fail safe function. Thus, the LED vehicle lighting apparatus in the second exemplary embodiment of the disclosed subject matter can operate the fail safe function when the controller 2b has trouble and/or an open circuit occurs in the load circuit including the LEDs LB and HB. In addition, because the resistors Rd1 and Rd2 can prevent the output of the DC-DC converter 2 from increasing during an open circuit, the voltage detection circuit Vd can result in reducing the breakdown of the DC-DC converter 2.

Figure 3A:
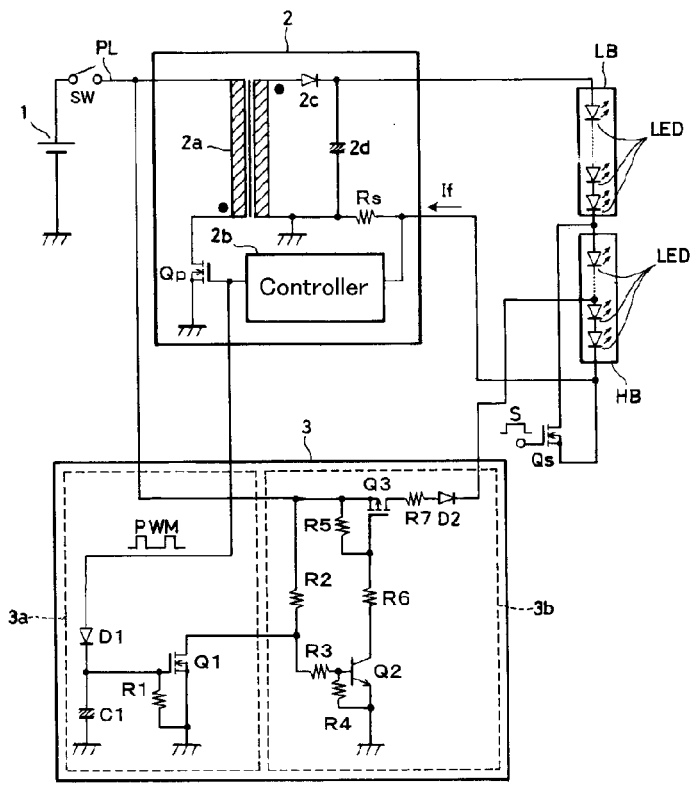
FIGS. 3a and 3b are respectively block circuit diagrams showing a variation of the first exemplary embodiment and a third exemplary embodiment of an LED vehicle lighting apparatus made in accordance with principles of the disclosed subject matter.
Figure 3B:
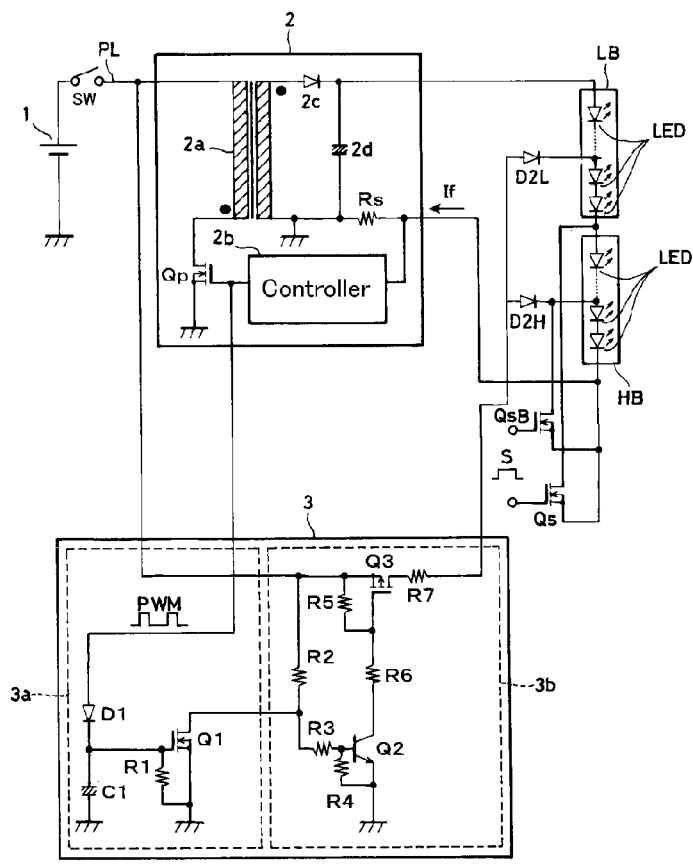

FIGS. 3a and 3b are a block circuit diagrams showing a variation of the first exemplary embodiment and a third exemplary embodiment of an LED vehicle lighting apparatus made in accordance with principles of the disclosed subject matter, respectively. In FIGS. 3a and 3b, the same or corresponding elements of the LED vehicle lighting circuit described above use the same reference marks as used in FIG. 1, and therefore their description and characterization of operation are abridged in the following description.

A difference between the LED vehicle lighting apparatus shown in FIG. 1 and that shown in FIG. 3a is a location of the LEDs that light for the fail safe function in the case that the controller 2b has a breakdown or trouble. In the LED vehicle lighting apparatus shown in FIG. 3a, the LEDs that light for the fail safe function can be selected between the LEDs HB so that the total forward voltage of the LEDs can be within the range of supply voltage of the vehicle battery 1.

Therefore, the LEDs for the fail safe function may emit light regardless of the signal of the FET Qs by the vehicle battery 1 when the controller 2b has a breakdown or trouble. In this case, when the LEDs LB and HB are used for a single vehicle lamp, the FET Qs may not be required. For example, when the LEDs LB and HB are used for a low beam of a headlight and another of the LEDs LB and HB are used for a high beam using the dual PWM control IC, the FET Qs may not be required in the LED vehicle lighting apparatus because it is not necessary for the FET Qs to switch between the low beam and the high beam.

The third exemplary embodiment will now be described with reference to FIG. 3b. The LED vehicle lighting apparatus of the third exemplary embodiment can include two outputs in the subsidiary feed circuit 3. One of the two outputs can be connected to the terminal between the LEDs LB via a diode D2L, and the other one can be connected to a terminal between the LEDs HB via a diode D2H as shown in FIG. 3a. A FET QsB for a switching element can be connected between the terminal of the LEDs HB and the cathode of the last LED in the LEDs HB.

When the controller 2b has a breakdown or trouble, the LEDs between the terminal of the LEDs LB and the last LED of the LEDs LB and the LEDs between the terminal of the LEDs HB and the last LED of the LEDs HB can be selectively lighted by the FET Qs and the FET QsB. When the FETs Qs and QsB are turned on by the signal S, the LEDs in the LEDs LB can light. However, the LEDs in the LEDs HB cannot light because circuits between the cathode of the last LED in the LEDs HB and both the cathode of the last LED in the LEDs LB and the terminal of the LEDs HB short.

Figure 5:
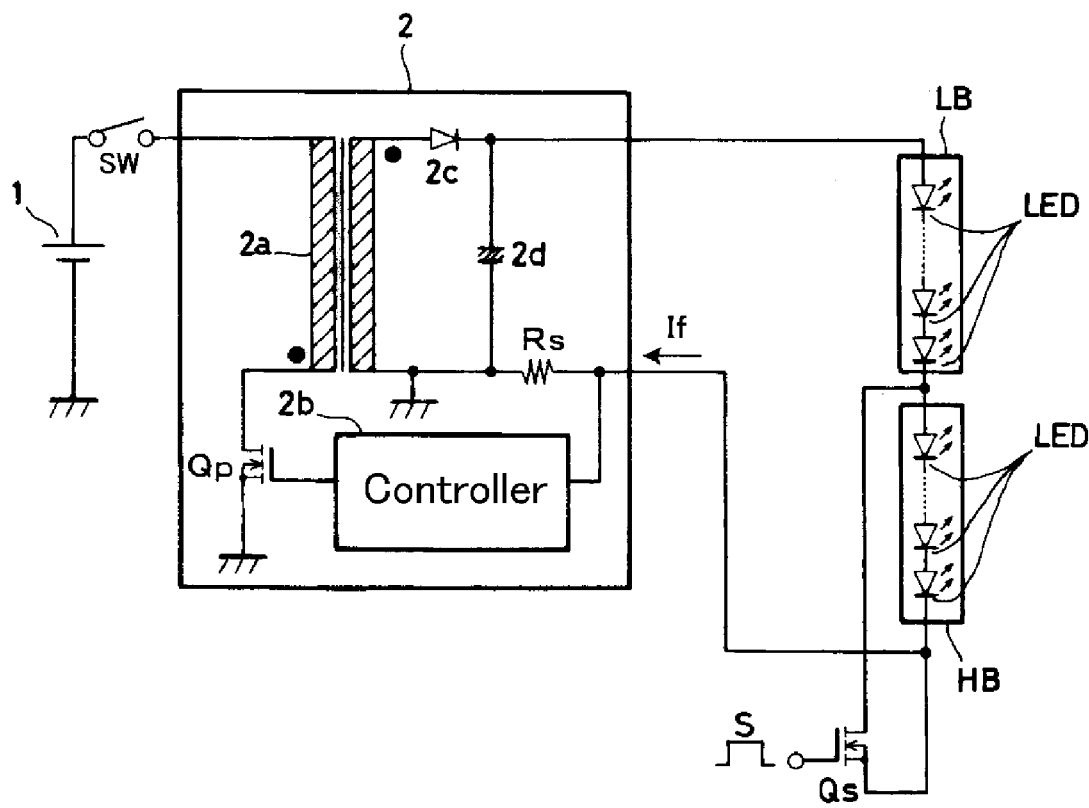
FIG. 5 is a circuit diagram showing a conventional lighting circuit for a vehicle lamp.

In this case, when the LEDs LB are used for a low beam, and when the LEDs LB, HB are used for a high beam as shown in the conventional lighting circuit of FIG. 5, the LEDs in the LEDs LB that are used for the low beam can light using their FETs Qs and QsB in case that the controller 2b has trouble. However, when the high beam is selected by the FET Qs and QsB, the LEDs in the LEDs HB that are used for the high beam cannot light so as to match the actual headlight when the controller 2b has trouble.

In the conventional lighting circuit, the LEDs LB can form a low beam and a high beam when the LEDs HB are disconnected. If a passing light is composed by the high beam, the passing light may not operate during lighting of the low beam. In addition, for instance, when the LEDs LB are used for a tail lamp and the LEDs LB, HB are used for a stop lamp, the LEDs LB and HB for the stop lamp may not operate during lighting of the LEDs LB for the tail lamp.

However, the LED vehicle lighting apparatus of the disclosed subject matter can control the LEDs LB an HB so as to match an actual combined lamp such as a headlight including a low beam and a high beam, a signal lamp including a tail lamp and a stop lamp, etc. In addition, the LEDs that light for the fail safe function can be arbitrarily selected from the LEDs LB and HB. Thus, the disclosed subject matter can provide various LED light apparatuses including a user friendly fail safe function.

Figure 4:
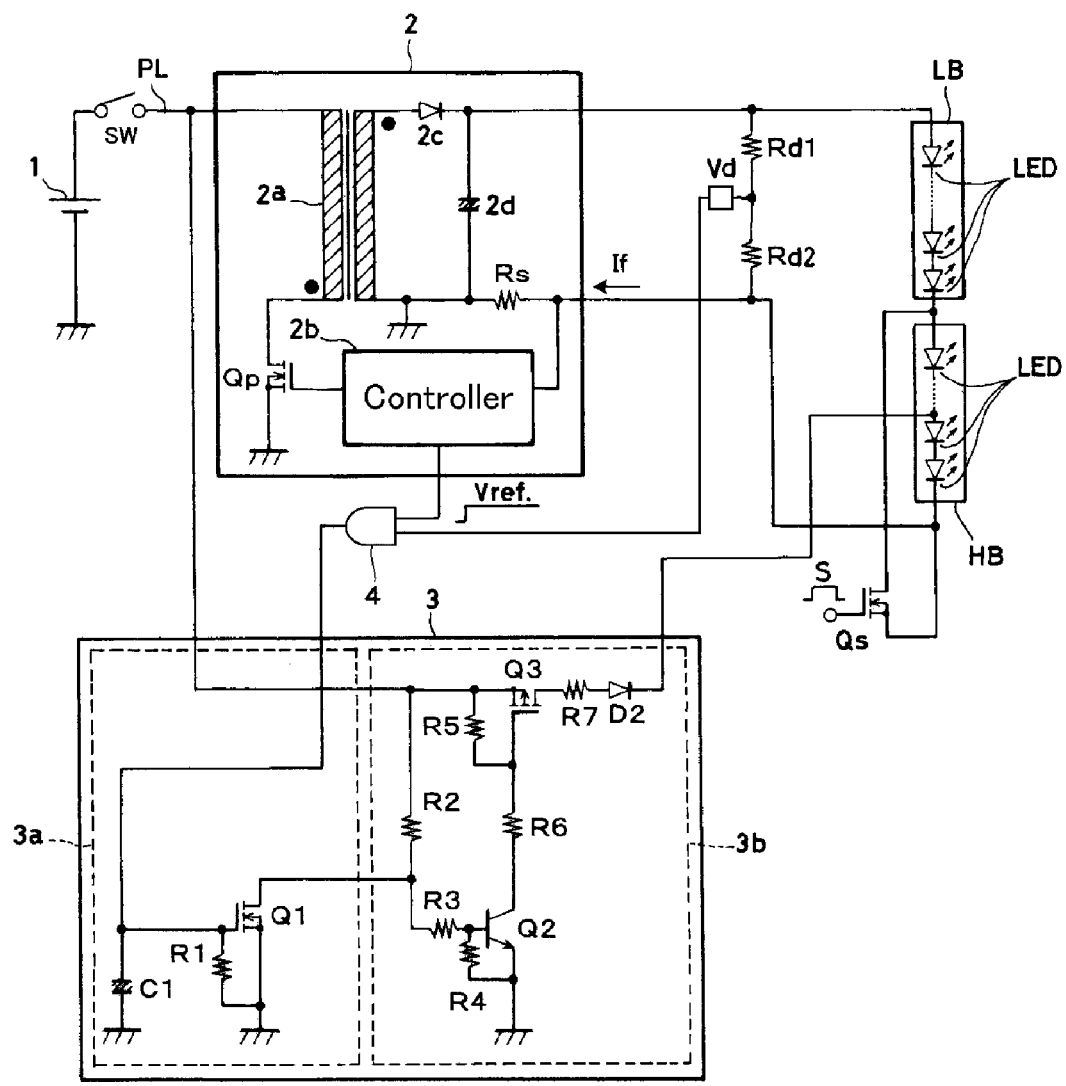
FIG. 4 is a circuit diagram showing a fourth exemplary embodiment of an LED vehicle lighting apparatus made in accordance with principles of the disclosed subject matter.

FIG. 4 is a block circuit diagram showing a fourth exemplary embodiment of an LED vehicle lighting apparatus made in accordance with principles of the disclosed subject matter. In FIG. 4, the same or corresponding elements of the LED vehicle lighting circuit described above use the same reference marks as those used in FIG. 2, and therefore their description and characterization of operation are abridged in the following description.

A difference between the LED vehicle lighting apparatus shown in FIG. 2 and that shown in FIG. 4 is a location of the LEDs that light for the fail safe function in the case that the controller 2b has a breakdown or trouble. In the LED vehicle lighting apparatus shown in FIG. 4, the LEDs that light for the fail safe function can be selected between the LEDs HB so that the total forward voltage of the LEDs can be within the range of voltage for the vehicle battery 1.

That is to say, the fourth exemplary embodiment can include the fail safe function shown in FIG. 3a and the function in the second exemplary embodiment shown in FIG. 2. Similarly, the fail safe function shown in FIG. 3b can also be included in the fourth exemplary embodiment shown in FIG. 4 so that the LED vehicle lighting apparatus can include the fail safe function for coping with trouble at the controller 2b and/or an open circuit of the load including the LEDs LB and HB in order to match an actual combined lamp.

As described above, the disclosed subject matter can provide LED vehicle lighting apparatuses including various variations in the fail safe function. These variations can be selected in accordance with a kind of vehicle such as an auto, a truck, a motorcycle and the like, and also in accordance with usage of the vehicle lamp, etc. Thus, the disclosed subject matter can provide various LED vehicle lighting apparatuses including a user friendly fail safe function associated with a lighting method in a vehicle lamp.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. An LED vehicle lighting apparatus comprising:
a plurality of LEDs connected in series including a first LED and a last LED, the first LED including an anode and a cathode, and the last LED including an anode and a cathode;
a DC-DC convertor including an input, an output, a switching element, a resistor and a controller, the output configured to supply electricity between the anode of the first LED and the cathode of the last LED, the input of the DC-DC converter being connected to a power supply and the switching element, the resistor configured to detect an LED current of the plurality of LEDs connected in series, the resistor connected between the output of the DC-DC converter and at least one of the anode of the first LED and the cathode of the last LED, the controller having an output that is connected to the switching element, and the controller configured to control the DC-DC converter so as to provide a larger voltage than a voltage of the power supply from the output of the DC-DC converter in accordance with the LED current detected by the resistor, such that the LED current is substantially constant during operation of the apparatus;
a signal detector including an input and an output, and the input of the signal detector configured to detect a breakdown of the controller; and
a feed controller including an input and an output, the input of the feed controller connected to the output of the signal detector, and the output connected between the plurality of LEDs, wherein at least one LED connected in series between an LED connected to the output of the feed controller and the last LED is lighted by the voltage of the power supply in accordance with a signal at the input of the signal detector.

2. The LED vehicle lighting apparatus according to claim 1, wherein the controller is configured with a PWM control IC having a reference voltage so that the reference voltage can output a signal when the PWM control IC has trouble.

3. The LED vehicle lighting apparatus according to claim 1, wherein the input of the signal detector is connected to the output of the controller.

4. The LED vehicle lighting apparatus according to claim 2, wherein the input of the signal detector is connected to at least one of an output of the PWM control IC and the reference voltage of the PWM control IC.

5. An LED vehicle lighting apparatus comprising:
a plurality of LEDs connected in series including a plurality of first LEDs and a plurality of second LEDs, the plurality of first LEDs including a first LED and a last LED, the first LED of the plurality of first LEDs including an anode and a cathode, the last LED of the plurality of first LEDs including an anode and a cathode, the plurality of second LEDs including a first LED and a last LED, the first LED of the plurality of second LEDs including an anode and a cathode, the last LED of the plurality of second LEDs including an anode and a cathode;
a first switching element including a gate, and configured to short between the anode of the first LED of the plurality of second LEDs and the cathode of the last LED of the plurality of second LEDs by the gate;
a DC-DC convertor including an input, an output, a switching element, a resistor and a controller, the output configured to supply electricity between the anode of the first LED of the plurality of first LEDs and the cathode of the last LED of the plurality of second LEDs, the input of the DC-DC converter connected to a power supply and the switching element, the resistor configured to detect an LED current of the plurality of LEDs connected in series, the resistor connected between the output of the DC-DC converter and at least one of the anode of the first LED of the plurality of first LEDs and the cathode of the last LED of the plurality of second LEDs, the controller having an output that is connected to the switching element, and the controller configured to control the DC-DC converter so as to provide a lager voltage than a voltage of the power supply from the output of the DC-DC converter in accordance with the LED current detected by the resistor, such that the LED current is substantially constant during operation of the apparatus;
a signal detector including an input and an output, the input of the signal detector configured to detect a breakdown of the controller; and
a feed controller including an input, a first output, and a second output, the input of the feed controller connected to the output of the signal detector, and the first output connected between the plurality of first LEDs, wherein at least one LED connected in series between an LED connected to the first output of the feed controller and the last LED of the plurality of first LEDs is lighted by the voltage of the power supply in accordance with a signal at the input of the signal detector and the gate of the first switching element.

6. The LED vehicle lighting apparatus according to claim 5, wherein the first output of the feed controller is connected to the gate of the first switching element via a resistor.

7. The LED vehicle lighting apparatus according to claim 6, wherein the controller is configured with a PWM control IC having a reference voltage so that the reference voltage can output a signal when the PWM control IC has trouble.

8. The LED vehicle lighting apparatus according to claim 7, wherein the input of the signal detector is connected to at least one of an output of the PWM control IC and the reference voltage of the PWM control IC.

9. The LED vehicle lighting apparatus according to claim 6, wherein the input of the signal detector is connected to the output of the controller.

10. The LED vehicle lighting apparatus according to claim 5, further comprising:
- a second switching element including a gate, and configured to short between an LED of the plurality of second LEDs and the cathode of the last LED of the plurality of second LEDs by the gate, and the LED of the plurality of second LEDs is connected to the second output of the feed controller, wherein at least one LED connected in series between the LED and the last LED of the plurality of second LEDs is lighted by the voltage of the power supply in accordance with the signal at the input of the signal detector and the gate of the second switching element.

11. The LED vehicle lighting apparatus according to claim 10, wherein the controller is configured with a PWM control IC having a reference voltage so that the reference voltage can output a signal when the PWM control IC has trouble.

12. The LED vehicle lighting apparatus according to claim 11, wherein the input of the signal detector is connected to at least one of an output of the PWM control IC and the reference voltage of the PWM control IC.

13. The LED vehicle lighting apparatus according to claim 10, wherein the input of the signal detector is connected to the output of the controller.

14. The LED vehicle lighting apparatus according to claim 5, wherein the controller is configured with a PWM control IC having a reference voltage so that the reference voltage can output a signal when the PWM control IC has trouble.

15. The LED vehicle lighting apparatus according to claim 14, wherein the input of the signal detector is connected to at least one of an output of the PWM control IC and the reference voltage of the PWM control IC.

16. The LED vehicle lighting apparatus according to claim 5, wherein the input of the signal detector is connected to the output of the controller.

17. An LED vehicle lighting apparatus comprising:
- a plurality of LEDs connected in series including a first LED and a last LED, the first LED including an anode and a cathode, and the last LED including an anode and a cathode;
- a DC-DC convertor including an input, an output, a switching element, a resistor and a PWM control IC, the output configured to supply electricity between the anode of the first LED and the cathode of the last LED, the input of the DC-DC converter connected to a power supply and the switching element, the resistor configured to detect an LED current of the plurality of LEDs connected in series, the resistor connected between the output of the DC-DC converter and at least one of the anode of the first LED and the cathode of the last LED, the PWM control IC including an output terminal, a reference voltage terminal, and a feedback terminal, the output terminal connected to the switching element, the reference voltage terminal configured to output a signal when the PWM control IC has trouble, the feedback terminal connected between the resistor and at least one of the anode of the first LED of the plurality of first LEDs and the cathode of the last LED of the plurality of second LEDs, and the PWM control IC being configured to control the switching element so as to provide a larger voltage than a voltage of the power supply from the output of the DC-DC converter in accordance with the LED current detected by the resistor via the feedback terminal, such that the LED current is substantially constant during operation of the apparatus;
- a voltage detection circuit including an output, and connected between the anode of the first LED of the plurality of first LEDs and the cathode of the last LED of the plurality of second LEDs;
- an AND circuit including an output and two inputs, and the two inputs connected to the output of the voltage detection circuit and the reference voltage terminal of the PWM control IC;
- a signal detector including an input and an output, and the input of the signal detector connected to the output of the AND circuit; and
- a feed controller including an input and an output, the input of the feed controller connected to the output of the signal detector, and the output of the feed controller connected between the plurality of second LEDs, wherein at least one LED connected in series between an LED connected to the output of the feed controller and the last of the plurality of second LEDs is lighted by the voltage of the power supply in accordance with a signal at the input of the signal detector.

18. An LED vehicle lighting apparatus comprising:
- a plurality of LEDs connected in series including a plurality of first LEDs and a plurality of second LEDs, the plurality of first LEDs including a first LED and a last LED, the first LED of the plurality of first LEDs including an anode and a cathode, the last LED of the plurality of first LEDs including an anode and a cathode, the plurality of second LEDs including a first LED and a last LED, the first LED of the plurality of second LEDs including an anode and a cathode, the last LED of the plurality of second LEDs including an anode and a cathode;
- a first switching element including a gate, and configured to short between the anode of the first LED of the plurality of second LEDs and the cathode of the last LED of the plurality of second LEDs by the gate;
- a DC-DC convertor including an input, an output, a switching element, a resistor and a PWM control IC, the output configured to supply electricity between the anode of the first LED of the plurality of first LEDs and the cathode of the last LED of the plurality of second LEDs, the input connected to a power supply and the switching element, the resistor configured to detect an LED current of the plurality of LEDs connected in series, the resistor connected between the output of the DC-DC converter and at least one of the anode of the first LED of the plurality of first LEDs and the cathode of the last LED of the plurality of second LEDs, the PWM control IC having an output terminal and a reference voltage terminal and a feedback terminal, the output terminal being connected to the switching element, the reference voltage terminal configured to output a signal when the PWM control IC has trouble, the feedback terminal being connected between the resistor and at least one of the anode of the first LED of the plurality of first LEDs and the cathode of the last LED of the plurality of second LEDs, and the PWM control IC being configured to control the switching element so as to provide a larger voltage than a voltage of the power supply from the output of the DC-DC converter in accordance with the LED current detected by the resistor, such that the LED current is substantially constant during operation of the apparatus;

a voltage detection circuit including an output, and connected between the anode of the first LED of the plurality of first LEDs and the cathode of the last LED of the plurality of second LEDs;

an AND circuit including an output and two inputs, and the two inputs connected to the output of the voltage detection circuit and the reference voltage terminal of the PWM control IC;

a signal detector including an input and an output, the input of the signal detector connected to the output of the AND circuit; and a feed controller including an input, a first output, and a second output, the input of the feed controller connected to the output of the signal detector, and the first output connected between the plurality of first LEDs, wherein at least one LED connected in series between an LED connected to the first output of the feed controller and the last LED of the plurality of first LEDs is lighted by the voltage of the power supply in accordance with a signal at the input of the signal detector and the gate of the first switching element.

19. The LED vehicle lighting apparatus according to claim 18, wherein the first output of the feed controller is connected to the gate of the first switching element via a resistor.

20. The LED vehicle lighting apparatus according to claim 18, further comprising:

a second switching element including a gate, and configured to short between an LED of the plurality of second LEDs and the cathode of the last LED of the plurality of second LEDs by the gate, and the LED of the plurality of second LEDs is connected to the second output of the feed controller, wherein at least one LED connected in series between the LED and the last LED of the plurality of second LEDs is lighted by the voltage of the power supply in accordance with a signal at the input of the signal detector and the gate of the second switching element.

* * * * *